United States Patent
Perkins et al.

(10) Patent No.: US 11,225,035 B2
(45) Date of Patent: Jan. 18, 2022

(54) METHOD FOR FLOWING FIBER TO FORM REGIONS OF RANDOMIZED FIBER ALIGNMENT IN A FIBER-COMPOSITE PART

(71) Applicant: Arris Composites Inc., Berkeley, CA (US)

(72) Inventors: J. Scott Perkins, Oakland, CA (US); Ethan Escowitz, Berkeley, CA (US); Erick Davidson, Piedmont, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 21 days.

(21) Appl. No.: 16/911,254

(22) Filed: Jun. 24, 2020

(65) Prior Publication Data

US 2020/0398502 A1    Dec. 24, 2020

Related U.S. Application Data

(60) Provisional application No. 62/865,842, filed on Jun. 24, 2019.

(51) Int. Cl.
*B29C 70/34* (2006.01)
*B29C 70/16* (2006.01)

(52) U.S. Cl.
CPC .............. *B29C 70/34* (2013.01); *B29C 70/16* (2013.01)

(58) Field of Classification Search
None
See application file for complete search history.

(56) References Cited

U.S. PATENT DOCUMENTS

| | | | | |
|---|---|---|---|---|
| 10,800,115 B2 * | 10/2020 | Escowitz | ................ | G06F 30/23 |
| 10,926,489 B2 * | 2/2021 | Davidson | .............. | B29C 70/345 |
| 2016/0319088 A1 * | 11/2016 | Saji | ........................... | C08K 7/06 |
| 2020/0016846 A1 | 1/2020 | Davidson et al. | | |
| 2020/0114545 A1 * | 4/2020 | Reese | ................ | B29B 17/0042 |
| 2020/0114596 A1 | 4/2020 | Davidson et al. | | |
| 2020/0130297 A1 | 4/2020 | Escowitz et al. | | |
| 2020/0171763 A1 * | 6/2020 | Escowitz | .............. | B29C 70/345 |
| 2021/0023800 A1 * | 1/2021 | Escowitz | ................ | G06F 30/17 |

* cited by examiner

*Primary Examiner* — Jeffry H Aftergut
(74) *Attorney, Agent, or Firm* — Kaplan Breyer Schwarz, LLP

(57) ABSTRACT

A method useful for forming a composite part having regions in which fibers align with the principle stress vectors as well as regions having a randomized fiber alignment. To form the randomized fiber alignment, a preform cavity is formed in a preform arrangement, and the preform arrangement is molded in accordance with compression molding protocols to form a part.

21 Claims, 11 Drawing Sheets

METHOD FOR FLOWING FIBER TO FORM REGIONS OF RANDOMIZED FIBER ALIGNMENT IN A FIBER-COMPOSITE PART

FIELD OF THE INVENTION

The present invention relates to additive molding of fiber-composite materials.

BACKGROUND

Any composite part, consisting of fibers within a matrix material, will exhibit mechanical and material properties that are a function of the orientation of its internal fibers. The matrix material possesses isotropic material properties, whereas the fibers present anisotropic properties that largely define the performance of the part.

Aligning the fibers in a composite part with the anticipated principal stress vector(s) arising therein maximizes structural performance of the part. However, the ability to do so in prior-art compression molding processes is quite limited. This due, in part, to the inherent limitations of the feed constituents that are typically used; namely fiber and resin in the form of tape or sheets.

The alignment issue is further complicated by the fact that the principal stress vector(s) can vary significantly in small volumetric regions of a part.

SUMMARY

The invention provides a way to address the significant variation in principal stress vectors that may occur in small volumetric regions a part.

The inventors recognized that it would be advantageous to orient the fibers is such small regions of interest in equally varied directions. The variation enables the composite to bear stresses in many directions. In accordance with the present teachings, this varied orientation of fibers in small discrete regions of a part is accomplished by causing fibers to flow into such discrete regions during the molding process.

Applicant has disclosed, in other specifications, how the flow of fibers can be driven by pressure gradients that are established within a compression molding tool during the compression-molding process. See, e.g., Pub. Pat. App. US2020/0016846, incorporated by reference herein. Such pressure gradients can be created during the compression-molding process by venting relatively small features/cavities within the larger mold cavity itself. The pressure gradients affect the flow and orientation of fibers, with the fibers flowing to regions of lower pressure (i.e., the vented cavities).

Using the aforementioned technique, the ability to achieve a desired fiber-orientation pattern in a discrete region of the part is primarily dependent upon the geometry of the compression-mold cavity. In many instances, however, there will be limited or no ability to freely provide and locate cavity features, as necessary, to achieve a desired localized fiber-orientation pattern in a final part using this technique.

The present invention provides a way to establish localized pressure gradients for flowing and orienting fibers in a way that is independent of the geometry of the mold cavity. Rather, in accordance with the present teachings, localized pressure gradients are established based on the manner in which fiber-bundle-based preforms, or assemblages thereof (referred to herein as "preform charges") are oriented within a compression-molding tool. In particular, the preforms or one or more preform charges (hereinafter collectively referenced "preforms," unless otherwise indicated) are arranged so that localized "cavities" are created in the arrangement of preforms. During the compression molding process, pressure gradients, resulting from the cavities, are utilized to create one or more regions of varied fiber orientation, as desired, within a part.

Localized cavities, as referenced above, can be formed in several ways. One way is to appropriately organize preforms to create a localized region of "empty" space between them. Another approach involves stacking overlapping preforms at varying angles, such that at least some of the preforms in the stack are not co-planer/co-linear. Other approaches for forming localized cavities based on preform organization may suitably be used.

In addition to being able to create a cavity in an arbitrary region of a compression mold, there is another significant difference between the aforementioned technique that relies of physical features of a mold cavity to create a pressure gradient versus embodiments of the invention. In particular, in the aforementioned technique, the fibers carried by the melted resin toward a feature tend to "weathervane," aligning with the substantially single major direction of flow. Thus, as the fibers, or portions thereof, enter the feature, they tend to align with one another. That does not create the randomized/varied fiber "alignment," as desired in accordance with embodiments of the invention. In accordance with the invention, since the cavities are created via preforms, fibers will flow from the surrounding preforms towards a central point in the cavity. Since flow fronts are approaching from many directions, the fibers moving each such fronts will have an alignment dictated thereby. The result being a region having fibers oriented in many directions; that is, randomized fiber alignment.

It occurred to the inventors that, notwithstanding the benefits of creating significant directional variation among the fibers within an appropriate small volumetric region of a part, material properties of the part would be further enhanced if such fibers continued into adjacent volumetric regions of the part that exhibit more consistent principal stress vectors, and were aligned with the principal stress vectors therein.

Thus, a composite part in accordance with embodiments of the present invention will possess both of the following types of volumetric regions:

(1) those in which the fiber alignment is consistent, non-varying, and typically unidirectional; and
(2) those in which the fiber alignment is random.

Moreover, a composite part in accordance with the illustrative embodiment possesses fibers that are continuous between both types of regions. That is, for some of the fibers composing such a fiber-composite part, part of each such fiber will be in a type (2) volumetric region, such that it does not share a common direction with other fibers in that region. And the same fiber will extend into a type (1) volumetric region, wherein that portion of each such fiber will align with other fibers in the same type (1) volumetric region.

In both consistent and random fiber-orientation volumetric regions, mechanical performance of the long, continuous fibers will exceed that of, for example, bulk molding compound (which consists of short fibers having random directionality). The increased performance of embodiments of the invention is attributable to the length and alignment of the long continuous fibers in the consistent region, and the length and continuity of the fibers in the randomized region.

It is notable that parts formed in accordance with the present teachings exhibit advantages over composite parts comprised of laminate plies. One may attempt to enhance the material properties of a composite part consisting of laminate plies by offsetting successive plies at an appropriate angle. Since fibers are aligned in the same direction in a given ply, offsetting the plies provide an ability, however limited, to orient the fibers. This ply-stacking technique may be suitable for parts that have a relatively simple configuration and that exhibit consistent directions of principal stress; however, most parts do not meet these constraints. Consequently, the performance of a ply-stacked part will suffer in those regions where the principal stress direction is varied. Embodiments of the present invention therefore present advantages compared to ply-stacked parts in which the principal stress direction is anticipated to vary across volumetric regions.

A part produced via conventional compression-molding equipment, but applying the present method, will have the same part geometry (as if the instant method were not applied), but with enhanced fiber orientation, resulting in enhanced properties. In other words, the enhanced part is produced without making any changes to the mold or molding equipment. Rather, in embodiments of the invention, enhancements of part properties as a consequence of a more-optimal fiber orientation are facilitated by the arrangement of applicant's fiber-bundle-based preforms. Specifically, changes in the arrangement of preforms are used to create localized volumetric region(s) having random fiber orientation anywhere within the entire volumetric region of a part being molded.

Where a continuous preform segment cannot be situated in a desired location due to size or geometry constraints, the resultant interfacial volumetric region in the "gaps" between the preforms will benefit from randomness in fiber orientation. In particular, the interlocking of fibers between the regions bordering the interfacial region is best accomplished via the variable fiber orientations produced by methods in accordance with the invention.

DETAILED DESCRIPTION

Definitions. The following terms are defined for use in this description and the appended claims:

"Fiber" means an individual strand of material. A fiber has a length that is much greater than its diameter. For use herein, fibers are classified as (i) continuous or (ii) short. Continuous fibers have a length that is about equal to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold. The term "short fiber," as used herein, is distinct from the "chopped fiber" or "cut fiber," as those terms are typically used in the art. In the context of the present disclosure, continuous fiber and/or short fiber is present in a preform and, as such, will have a defined orientation in the preform, the mold, and the final part. As used generally in the art, chopped or cut fiber has a random orientation in a mold and the final part.

Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" means a segment of a continuous resin-infused fiber bundle (e.g., towpreg, the output from a pultrusion line, etc.), wherein the segment has a desired length and shape. Substantially all fibers in any given preform will necessarily have the same length, and are unidirectionally aligned. The cross section of the fiber bundle typically has an aspect ratio (width:thickness) of between about 0.25 to about 6. The term "preform" explicitly excludes sized/shaped (i) tape (which typically has an aspect ratio—cross section, as above-of between about 10 to about 30), (ii) sheets of fiber, and (iii) laminates. The modifier "fiber-bundle-based" is often appended, herein, to the word "preform" to emphasize the nature of applicant's preforms and to distinguish them from prior-art preforms, which are typically in the form of segments of tape or a shape cut from sheets of fiber. But regardless of their ultimate shape/configuration, these prior-art preforms do not provide an ability to control fiber alignment in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 1000 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means+/−20% with respect to a stated figure or nominal value (e.g., a size, a location, a position, an angular orientation, etc.)

Additional definitions may appear in context throughout this specification.

Unless otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

The illustrative embodiment of the invention is a method for providing localized volumetric regions of random fiber orientation within a part. Such regions are formed at locations in which the anticipated principal stress vectors (i.e., when the finished part is in use) will be inconsistent and highly variable with small changes in location. In some embodiments, for fibers that extend beyond such localized regions into other volumetric regions in which the principal stress vectors are more consistent, the method results in a fiber alignment wherein the fibers are randomly oriented in the localized regions yet align with the principal stress vectors in other regions.

Embodiments of the invention utilize fiber-bundle-based preforms and preform charges, as defined herein. Although flat tape, sheets, and laminates, as are used for other molding applications in the prior art, might be suitable for use in certain portions of a part (e.g., a relatively large, flat region, etc.) made in conjunction with embodiments of the invention, any use of such alternative feed constituents is exceedingly limited.

Each fiber-bundle-based preform, like the spool of prepreg or the pultrusion-line output from which it is sourced, include thousands of unidirectionally aligned, resin-infused fibers, typically in multiples of one thousand (e.g., 1k, 10k, 24k, etc.). A preform may have any suitable cross-sectional shape (e.g., circular, oval, trilobal, polygonal, etc.).

The individual fibers in the fiber-bundle-based preform will typically have a diameter in a range of about 1 to about 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

Any resin—thermoplastic or thermoset—that bonds to itself under heat and/or pressure can be used in the fiber bundles. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

For a variety of reasons, in some embodiments, rather than adding individual fiber-bundle-based preforms to a mold cavity, one or more assemblages of such preforms—referred to herein as a "preform charge"— is placed in the mold cavity. The preform charge, which is typically three-dimensional arrangement of preforms, is usually created in a fixture separate from the compression mold, and which is dedicated and specifically designed for that purpose. To create a preform charge, preforms are placed (either automatically or by hand) in a preform-charge fixture. By virtue of the configuration of the fixture, the preforms are organized into a specific geometry and then joined/tacked together. The preform charge is not fully consolidated, but once the preforms are joined, they will not move, thereby maintaining the desired geometry and the specific alignment of each preform in the assemblage. The shape of the preform charge usually mirrors that of the intended part, or at least a portion of it, and, hence, the mold cavity (or at least a portion thereof) that forms the part. See, e.g., Publ. Pat. App. US2020/0114596 and U.S. patent application Ser. No. 16/877,236, incorporated herein by reference.

In some embodiments, each preform, whether present as individual preforms in a mold layup, or tacked together in a preform charge, will have the same composition as all other preforms (i.e., the same fiber type, fiber fraction, and resin type). However, in some other embodiments, some of the preforms can differ from one another. For example, there may be instances in which different properties, such as may be imparted by different types of fibers, changes in fiber fraction, resin type, etc., are desired at different regions within a complex part.

It is preferable, but not necessary, for all preforms to include the same resin. But to the extent different resins are used in different preforms, they must be "compatible," which means that they will bond to one another. A preform charge can also include inserts that are not fiber based. Unless otherwise indicated, the terms "preforms" or "fiber-bundle-based preforms" as used hereinafter in this disclosure and the appended claims, means "preforms and/or preform charge(s)."

Embodiments of the invention apply to compression-molding processes. Compression molding involves the application of heat and pressure to feed constituents for a period of time. The applied pressure is usually in the range of about 100 psi to about 300 psi, and temperature, which is a function of the particular resin being used, is typically in the range of about 150° C. to about 400° C. Elevated pressure and temperature are typically maintained for a few minutes. Thereafter, the mold is removed from the source of pressure and is cooled. Once cooled, the finished part is removed from the mold.

During compression molding, the resin in the preforms melt and takes the shape of the cavity in which it is situated. Once the applied heat causes the resin to enter its melt phase, the applied pressure causes the resin to fill the molding cavity by means of viscous flow. Despite being in the melt phase, the viscosity of the resin is generally significant enough to carry the fibers with it as it fills the mold cavity. Proper processing ensures the homogeneous distribution of fibers within the resin during the viscous flow phase. This homogeneity is maintained as the resin cools and takes its final shape.

Applicant has discovered that by means of a pressure gradient within the mold cavity, appropriate-length fibers can be flowed into features of the cavity with a desired alignment. Once in its melt phase, the resin will flow from regions of relatively higher pressure to those of relatively lower pressure, carrying the fibers with it. In embodiments of the invention, the cavities that create the pressure gradients are themselves created by the arrangement of preforms (i.e., either a layup of plural individual preforms or a preform charge), as opposed to cavities/small features created by the shape of the compression mold itself. The cavities created by the preforms, referred to herein as "preform cavities," are independent of the mold geometry, and thus can be situated anywhere in a mold cavity. Consequently, randomized fiber alignment can be formed in one or more arbitrary volumetric regions of the part, solely by changing the position, in the arrangement of preforms within the mold.

The preform cavities are created by arranging preforms in such a way as to create empty space. This can be accomplished, for example and without limitation, by simply creating a gap between preforms, such as between opposed ends thereof. Alternatively, a preform cavity can be formed by appropriately stacking overlapping preforms such that an overlying preform does not axially align with an underlying preform. Those skilled in the art, in light of the present disclosure, will be able to develop many different arrangements of preforms that are capable of creating one or more preform cavities. It will be understood that multiple different preform arrangements can be used to form multiple preform cavities during compression molding of a single part.

Thus, embodiments of the invention involve creating empty space via a preform arrangement. During compression molding, the applied heat causes the resin to enter its melt phase, and the applied pressure, in conjunction with one or more preform cavities created in accordance with the method, creates a pressure gradient in the mold. The resin then flows into and fills the preform cavity. The flow of the matrix material into the cavity carries fibers (from the preforms) with it. The filling of the preform cavity, as caused by the pressure gradient, is driven by turbulent fluid dynamics, and can thus be considered a chaotic mixing process. As the melted resin turbulently flows and mixes to fill the preform cavity, the fibers in the resin mix as well. The result is a discrete volumetric region within the part having random fiber directionality. The fibers are continuous, and typically extend well beyond the region of random directionality. In such other regions, the fibers tend to have a uniform alignment consistent with the principal stress vector of the particular region, as a consequence of the original preform arrangement.

Just as preform flow segments intended to fill mold cavities must be sized (i.e., have an appropriate length) and suitably situated to flow properly (see, e.g., Pub. Pat. App. US2020/0016846), so too must the preforms having fibers that are to be flowed into a preform cavity. Creation of a preform cavity requires that surrounding volumetric regions be overfilled by the volume of material required to fill the volume of the preform cavity. Methods in accordance with the invention are thus best realized through purposeful design of the overall preform arrangement.

Fibers from preforms closest to a preform cavity will flow soonest, per the greatest pressure gradient, and will thus reach further into the empty space of the preform cavity as it is being filled. Extrapolating the reach of the pressure gradient, fibers in preforms further from the preform cavity will flow into the cavity sequentially, per their initial distance relative to the preform cavity. The preferential flowing of fibers into the preform cavity contributes to the final internal fiber alignment of the filled cavity in the molded part.

The size and shape of the preforms adjacent to the preform cavity will also contribute to the final internal fiber alignment of the filled preform cavity. Adjacent preforms will flow preferentially depending on their length. That is, shorter-length preforms, which have shorter fibers, are less constrained than their longer-length neighbors. Additionally, a bent preform that extends into the preform cavity will release internal stress once the resin in such a preform approaches the melt phase. As the bent preform is suspended in the preform cavity, the empty space enables the relaxation of internal stress between the fibers and the resin, permitting them to splay before the fibers from preforms at the cavity boundary begin to flow into the cavity. The shape and sizing of adjacent preforms, as well as their positioning/spacing, all contribute to the dynamics of the preform-cavity filling process.

The final factor in determining preform-cavity fill dynamics is the shape of the preform cavity. The shape and form of mold cavities are limited to the geometry of the molded part, but not so the shape and form of preform cavities. Thus, many more geometries are possible for preform cavities. The shape and location of the preform cavity can be engineered to yield desired fiber entanglement through mixing of adjacent preforms. As with any example of fluid dynamics, the shape of a body in which a fluid travels will guide its flow. Moreover, the shape of the preform cavity can be engineered analogously to the shaped charge of an explosive device, wherein the shape of the charge determines the travel of its molten constituency. Such preform-cavity shaping can be used to affect mixing dynamics of the fibrous flow.

Thus, any combination of preform sizes, shapes, and spacing, in tandem with cavity shape and location, results in internal flowed-fiber structures via pressure gradient. Volumetric regions having such internal flow structures will exhibit a high degree of variability in fiber orientation as a result of fluid mixing. This variability in fiber orientation results in decreased anisotropy, which is advantageous for volumetric regions having variable directions of principal stress.

For a compression-molding process to yield fully consolidated parts, the volume of material placed into the mold must match the volume of the finished part. Similarly, embodiments of the present invention require that the volume of material intended to flow into a preform cavity match the volume of the cavity. Failure to do so risks the creation of voids in the molded part.

Those skilled in the art will appreciate that in view of the number of variables involved, and the inherent complexity of turbulent flow, computational fluid dynamics (CFD) is advantageously used to optimize the flow of fibers into a preform cavity.

Figure 1:
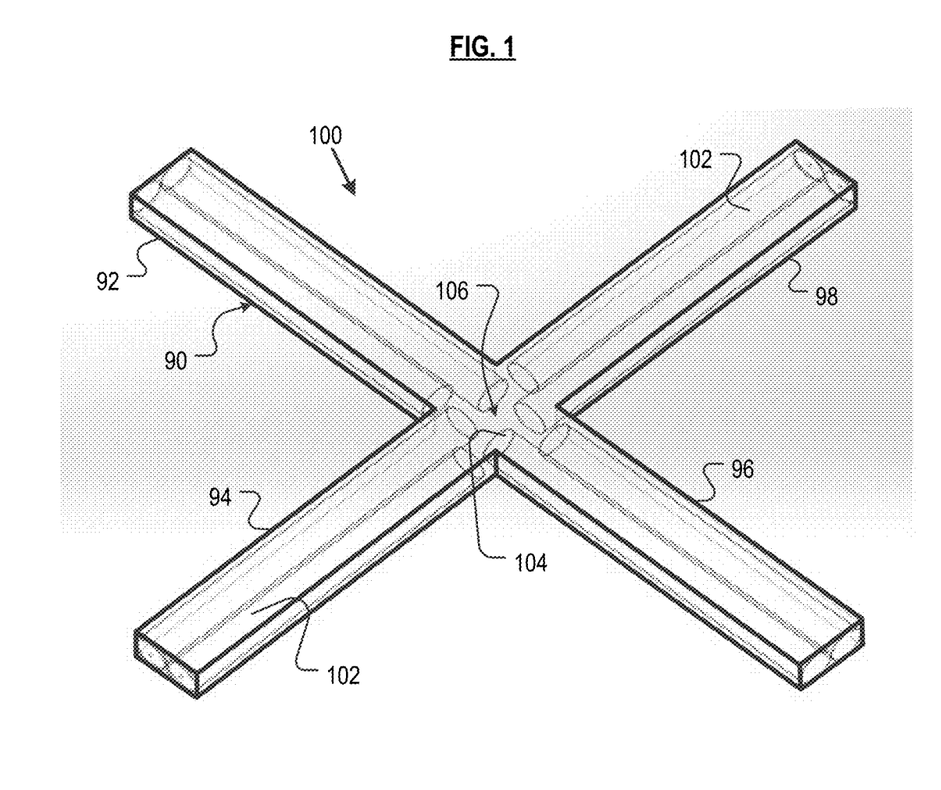
FIG. 1 depicts a preform layup for a hub-and-spoke part, wherein the perform layup creates a cavity in accordance with an illustrative embodiment of the present invention.

FIG. 1 depicts mold 90, which is used to form a hub-and-spoke type part. Mold 90 includes four spokes or arms 92, 94, 96, and 98, which extend from a central region. Preform arrangement 100 resides in mold 90. The arrangement includes two preforms 102 in each one of the arms 92 through 98. As previously mentioned, the preform arrangement can be either a lay-up of individual preforms, or a preform charge, wherein the preforms are tacked together.

The part formed from the preforms in mold 90 will have four long arms extending from the central region, like the mold itself. Each of the four arms of the part are expected to have principal stress vectors that align with their major (long) axis. The central region between the arms, however, is expected to have highly varied principal stress vectors.

In light of stress analysis, and in accordance with the present teachings, a preform cavity should be formed in the central region of the mold. As previously described, the empty space of the preform cavity will result in a pressure gradient during the compression molding process, wherein the pressure gradient urges the ends of the fibers of the surrounding preforms to flow inwardly and mix. This ensures that the ends of the fibers within the central region have, collectively, varied directionality. Furthermore, the portions of the fibers that fall within the arms should align with the long axis of the arms.

To that end, preform cavity 106, situated in the central region, is formed between ends 104 of preforms 102. This accomplished, in this embodiment, by varying the lengths of preforms 102. Fibers within each preform 102 are long and continuous, and align with the major axis of the respective preform.

The flow dynamics into the cavity can be guided by preferentially sizing and shaping portions of surrounding preforms. Once consolidated into a final part through a compression molding process, long fibers will align to principle stresses in the surrounding regions and continuously transition into random orientations in the central region as a result of flowing into the preform cavity.

Figure 2A:
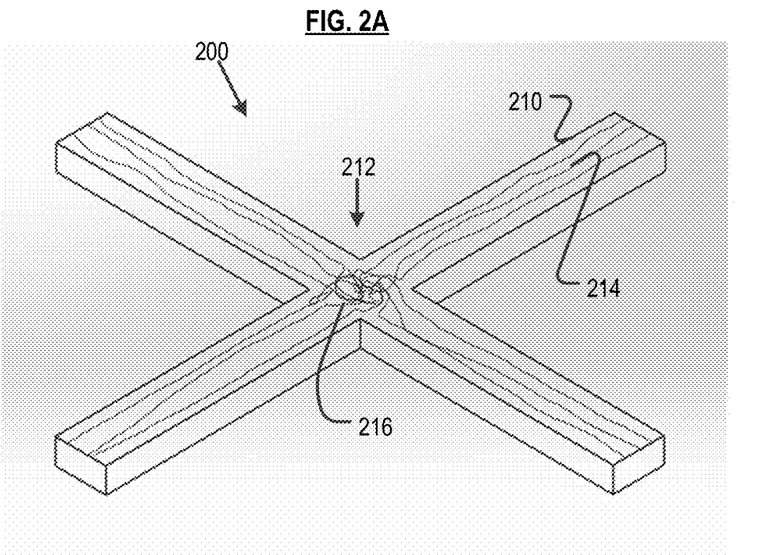
FIG. 2A depicts the fiber alignment in the hub-and-spoke part formed via compression molding of the preform layup of FIG. 1.

FIG. 2A depicts consolidated hub-and-spoke part 200 produced by compression molding of preform arrangement 100 of FIG. 1. The lines on the upper surface of the part are indicative of fiber alignment within the volume of the part. Portion 214 of the fibers in arms 210 of the part exhibit consistent alignment along the major axis of the arms. Portion 216 of the fibers in volumetric central region 212 depicts a random alignment, which results from fluidic mixing that occurs during molding, due to the presence of the centrally located preform cavity and the flow gradient it caused. In particular, and as previously discussed, the pressure gradient results in a flow of material into the cavity, yielding a complex entanglement of fibers as the material mixes and fills the cavity.

Figure 2B:
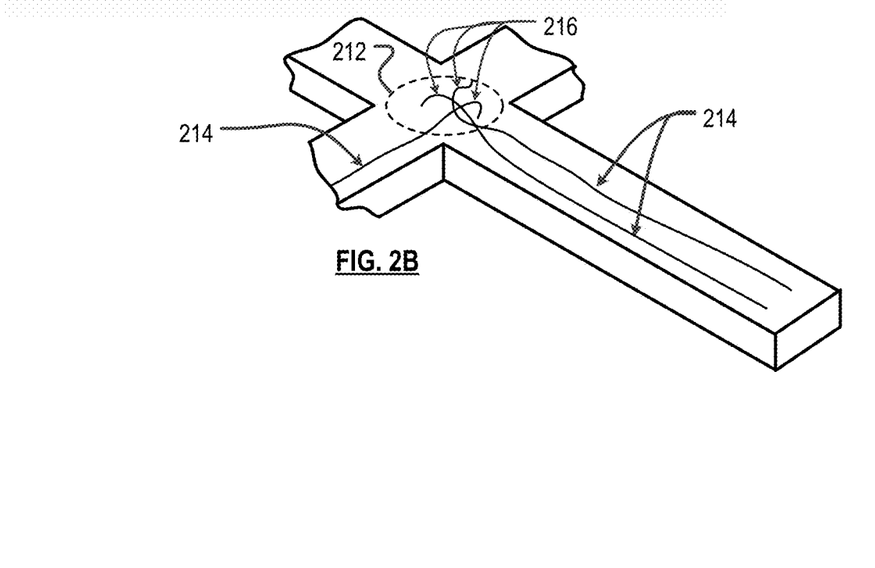
FIG. 2B depicts further detail of fiber alignment shown in FIG. 2A.

It is notable that the fibers extend between the central region and each arm region. That is, for many of the fibers in part 200, a portion (i.e., portion 216) of each such fiber resides in central region 212 and a portion (i.e., portion 214) resides in one of the arms 210. This is depicted for a few fibers in the enlargement of a portion of part 200 shown in FIG. 2B. Like FIG. 2A, the lines (fibers) on the upper surface of part 200 are indicative of fiber alignment within the volume of the part. For each of the three fibers depicted, portion 216 is in volumetric region 212 having randomized fiber alignment, and portion 214 is in arms 210, wherein alignment is consistent with the long axis of each arm.

The anticipated principle stress vectors arising in an in-use part can be estimated, or determined, as follows. Consider first a simple part, such as produced from mold 90 in FIG. 1. Those skilled in the art will know, based on experience, that for best part strength, fibers should align with the long axis of arms 210. This will be the case for most if not all loading situations. Similarly, one skilled in the art will expect that the central region 212 where the arms converge is likely to be a location in which the principle stress vectors can be expected to vary significantly. In accordance with the present teachings, this is the region in which, in accordance with the presence teachings, fiber direction should be randomized.

For more complicated scenarios, either as consequence of part geometry, the forces to which the part is subjected in use, or both, the anticipated principle stress vectors can be determined, for example, using the techniques disclosed in Pub. Pat. App. US2020/00130297, incorporated by reference herein. Briefly, that application discloses: (a) developing a description of the part's geometry, (b) developing a description of the part's anticipated loading conditions, and (c) performing a finite element analysis (FEA) on the part geometry to calculate the stress under load. This results in a three-dimensional principal stress contour map for the interior of the component. The referenced publication discloses that by considering the orthotropic material properties at hand, a preform "map" (i.e., a preform layout/arrangement) can be developed from the principal stress contour map, such as by using a technique that determines "low-cost" routing. See also, U.S. patent application Ser. No. 16/811,537.

Regarding step (c) above, for every point in a given part with a given load case, there exists a stress state with six stresses aligned with the x, y, z axes and the shear stresses between them. If one rotates that stress state such that the shear stresses go to zero, the result is three, mutually orthogonal principal stresses. Each principle stress has a magnitude (which can be zero) and a direction; hence "stress vector." The directions are orthogonal to one another. This stress tensor can rotate and change in magnitude from one element (in the finite element analysis) to the next.

A determination as to the nature of the fiber alignment (i.e., "aligned" or "random") in any particular region considers the principal stress tensors in that region. If the maximum or minimum principal stress is significantly larger than the other two, and follows a straight line or curves in a certain direction, fibers (in the part) can be aligned therewith, with few if any fibers being aligned in other directions ("off-axis" directions). If, on the other hand, a region has two or more principal stresses with substantially similar magnitudes, then, ideally, fibers should be aligned in multiple directions (i.e., the directions of the principal stresses) or randomized in an attempt to address the plural directions of such stresses.

As those skilled in the art will appreciate in light of this discussion, the determination of whether the fibers in a particular volumetric region of a part are to be "aligned" or "randomized" must take into account the size of the region. That is, an "element" in a map generated via FEA analysis will generally correspond to a very small region of a part (this relationship is set as an input to the FEA analysis). Thus, even if the stress vector is relatively consistent over several "elements," it may be impractical, if not impossible, to attempt to establish a fiber alignment in the finished part for such a small region.

More particularly, the analysis must consider the diameter of the towpreg (from which the fiber-bundle-based preforms are formed) relative to the stress vector "gradient"—that is, the rate of change in direction between principle stress vectors. In other words, if the diameter of the fiber-bundle-based preform is too large to bend so as to create a shape that mirrors the rapid variance in the stress vectors in a particular region, such a region is to have a randomized fiber alignment as created by a preform cavity, in accordance with the present teachings. If the region in question is large enough so that the fiber-bundle-based preforms could be bent to conform to the variance in stress vectors, resulting in a region in the part having a suitably varied fiber alignment, then the use of a preform cavity is not required.

It is within the capabilities of those skilled in the art, in light of the foregoing, and based on preform-bundle diameter, the capability of the equipment used to shape the towpreg into preforms, and the correspondence between FEA element size and actual physical dimensions, to determine which regions of the map of principle stress vectors should be designated as those corresponding to regions of a part in which a defined fiber alignment will be established, and which regions should be designated as those corresponding to regions of the part in which a randomized fiber alignment will be established.

Applicant's techniques for aligning fibers (e.g., the use of fiber-bundle based preforms, pressure gradients, etc.) can be used to substantially align fibers with the anticipated principle stress vectors in regions in which they are relatively uniform and can be reliably aligned. And applicant's technique for creating regions of randomized fiber alignment (e.g., preform cavities, pressure gradients, etc.) can be used in regions in which the stress vectors are rapidly changing.

Figure 3:
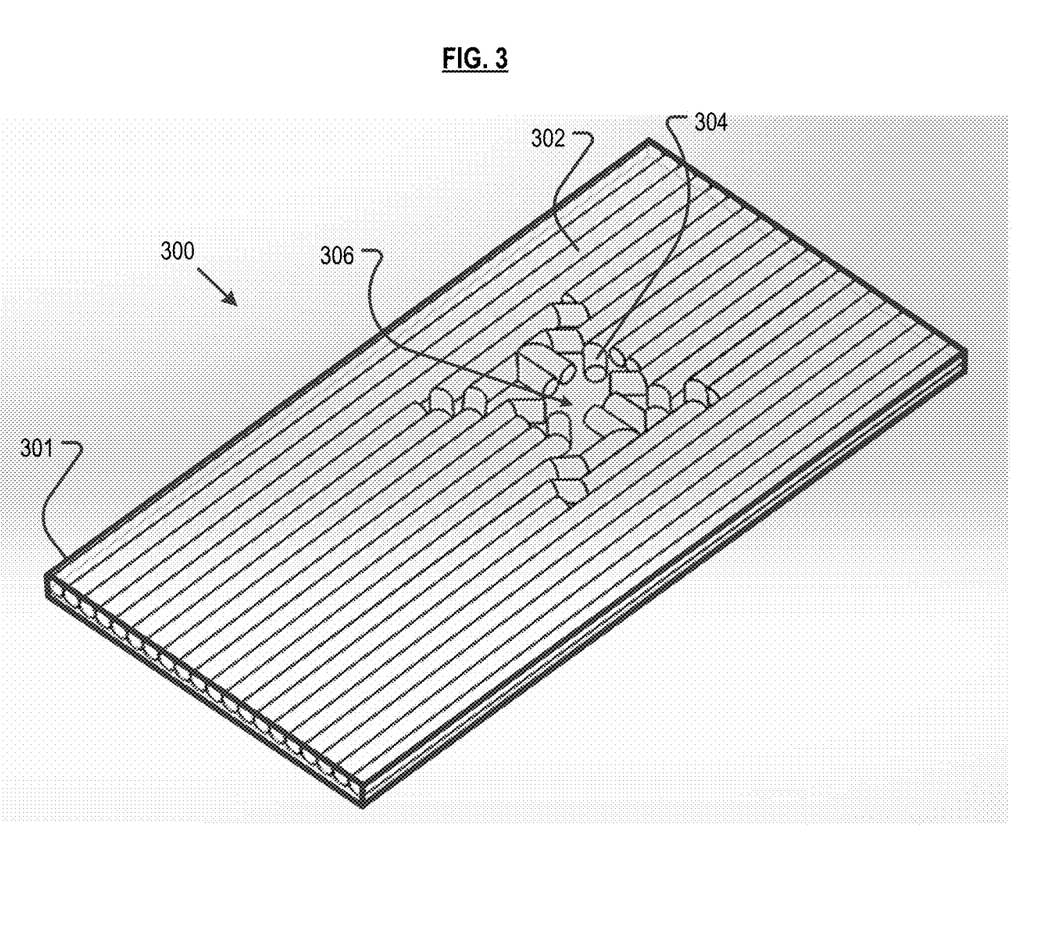
FIG. 3 depicts a preform layup that defines a localized cavity within a larger region of aligned fiber, in accordance with an illustrative embodiment of the present invention.

The embodiment depicted in FIG. 3 illustrates the use of the inventive method to create a localized volumetric region of randomized fiber aligned at a specific location with a larger volumetric region of aligned fiber.

FIG. 3 depicts volumetric region 301, which can be on the surface of, or internal to, a part that is to be formed. Preform arrangement 300 within volumetric region 301 includes plural aligned preforms 302, as well as preform cavity 306. In regions other than cavity 306, principal stress is anticipated to be directionally consistent and preforms 302 are aligned consistent therewith.

Preform cavity 306 is formed by cutting the preforms in the region in which the cavity is to be formed, or by using shortened preforms. Ends 304 of the preforms defining the perimeter of the preform cavity are oriented in a variety of directions. The varied orientation of end 304 of each preform promotes the entanglement of fibers within the preform cavity as the melt flows into the cavity during the compression molding process.

Figure 4:
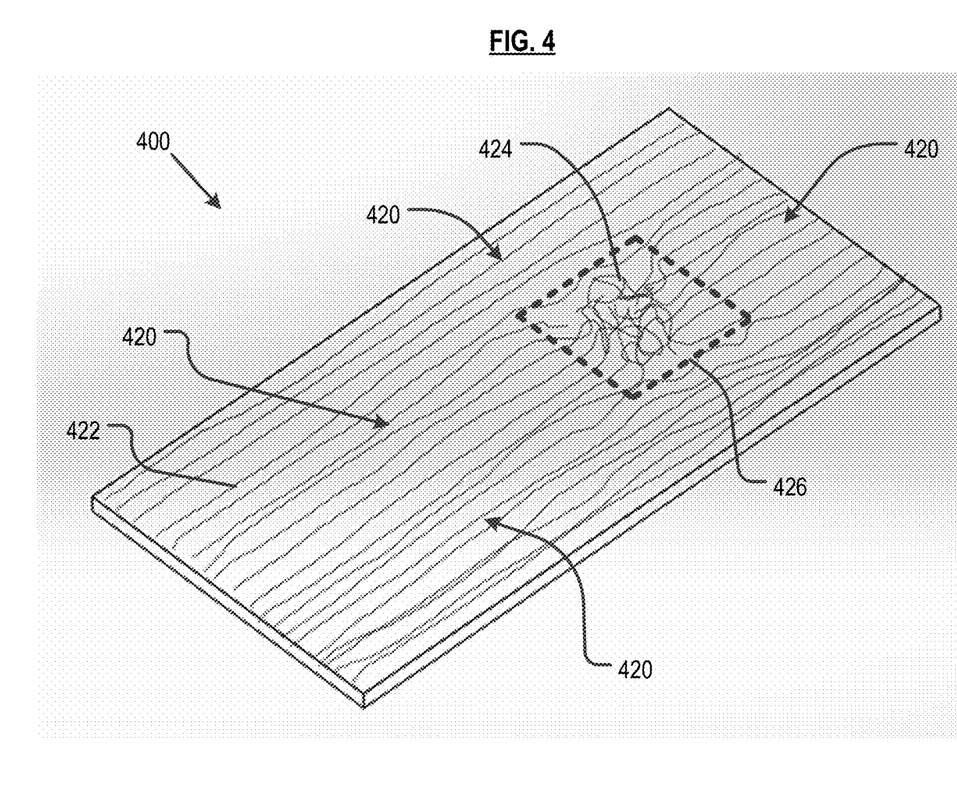
FIG. 4 depicts the fiber alignment in a part formed via compression molding of the preform layup of FIG. 3.

FIG. 4 depicts consolidated form 400, resulting from the compression molding of preform arrangement 300 of FIG. 3. Lines on the surface are indicative of fiber alignment within the volume of the part. Portion 422 of the continuous fibers from preforms 302 remain aligned in region 420, which has a consistent principal stress direction. And portion 424 of those fibers exhibit a random and varied alignment within localized region 426. Once again, and quite importantly, the fibers are continuous between region 420 and region 426.

The positioning of preform cavities to yield volumetric regions of locally randomized fiber alignment can be used to secure inserts, such as fasteners or electronics, that are to be co-molded into a part. The locally random fibers evenly distribute stress at the insert, while the globally aligned fibers increase overall strength. Such an embodiment is depicted in FIGS. 5 and 6.

Figure 5:
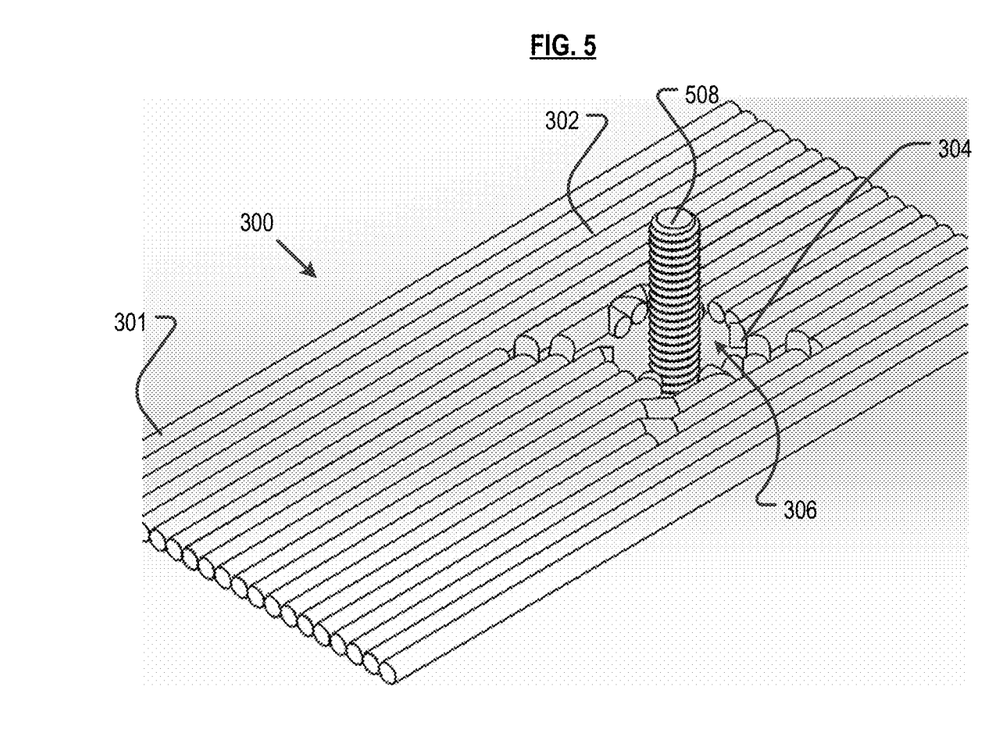
FIG. 5 depicts a preform layup having a threaded insert in a preform cavity, in accordance with an illustrative embodiment of the present invention.

FIG. 5 depicts volumetric region 301 and preform arrangement 300 of FIG. 3, but with threaded insert 508 situated within preform cavity 306. Features (not depicted) within the compression mold tool hold insert 508 in position. The principal stress direction is anticipated to be highly varied surrounding insert 508.

Figure 6:
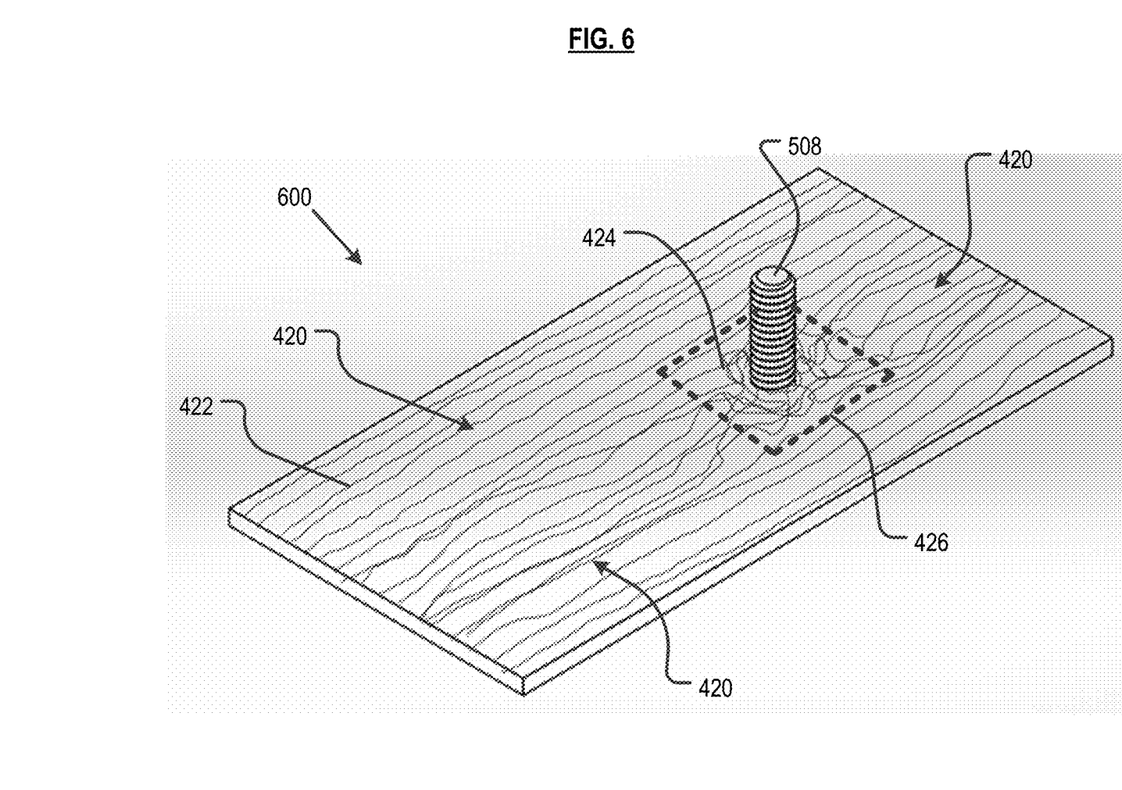
FIG. 6 depicts the fiber alignment in the part formed via compression molding of the preform layup with threaded insert of FIG. 5.

FIG. 6 depicts consolidated form 600, resulting from the compression molding of preform arrangement 300 of FIG. 5. Lines on the surface are indicative of fiber alignment within the volume of the part. Portion 422 of the continuous fibers from preforms 302 remain aligned in region 420, which has a consistent principal stress direction. And portion 424 of those fibers exhibit a random and varied alignment within localized region 426 near threaded insert 508.

Figure 7:
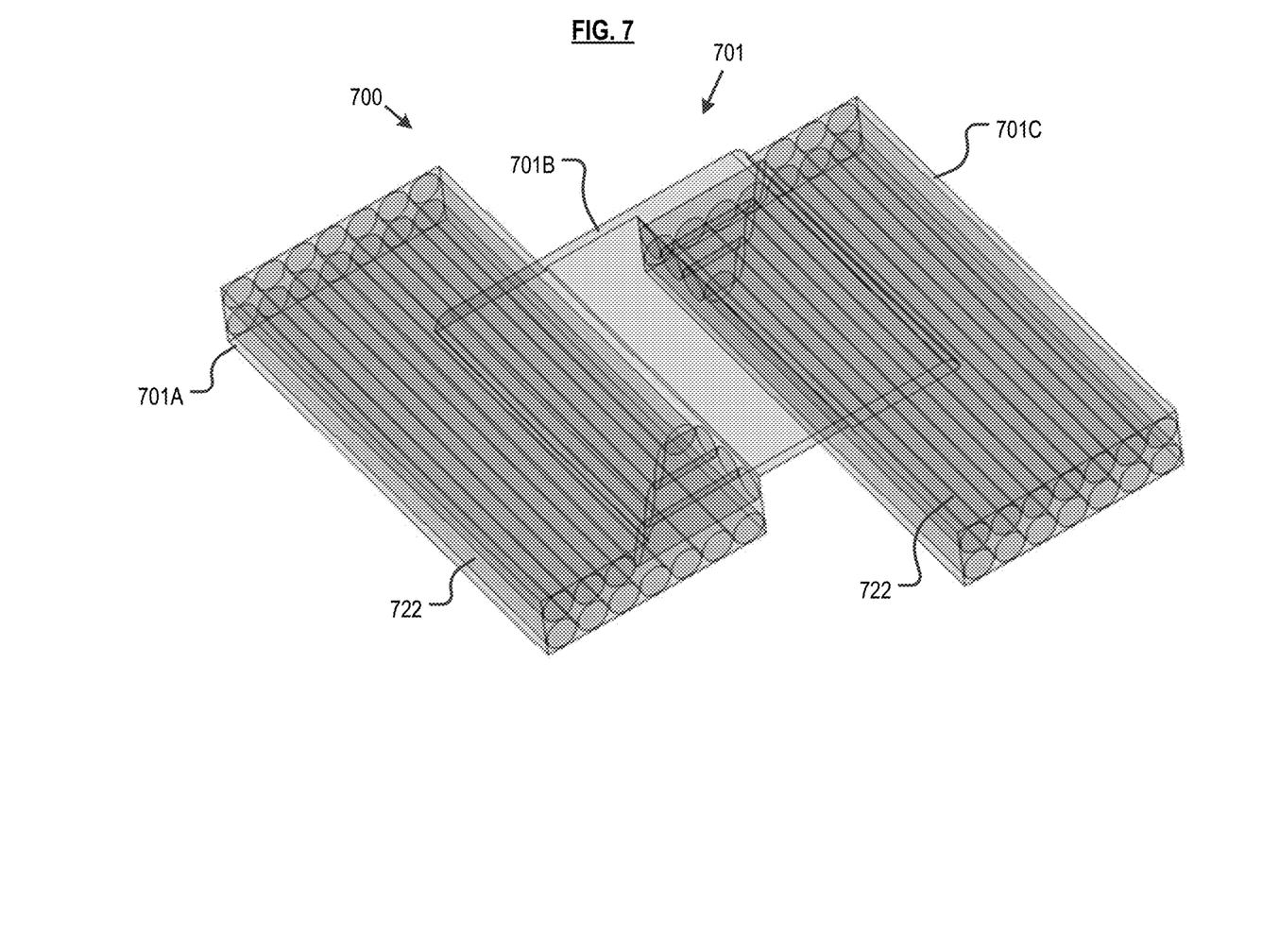
FIG. 7 depicts a preform layup for part having a bridging region that is too thin for the placement of preforms, in accordance with an illustrative embodiment of the present invention.
Figure 8:
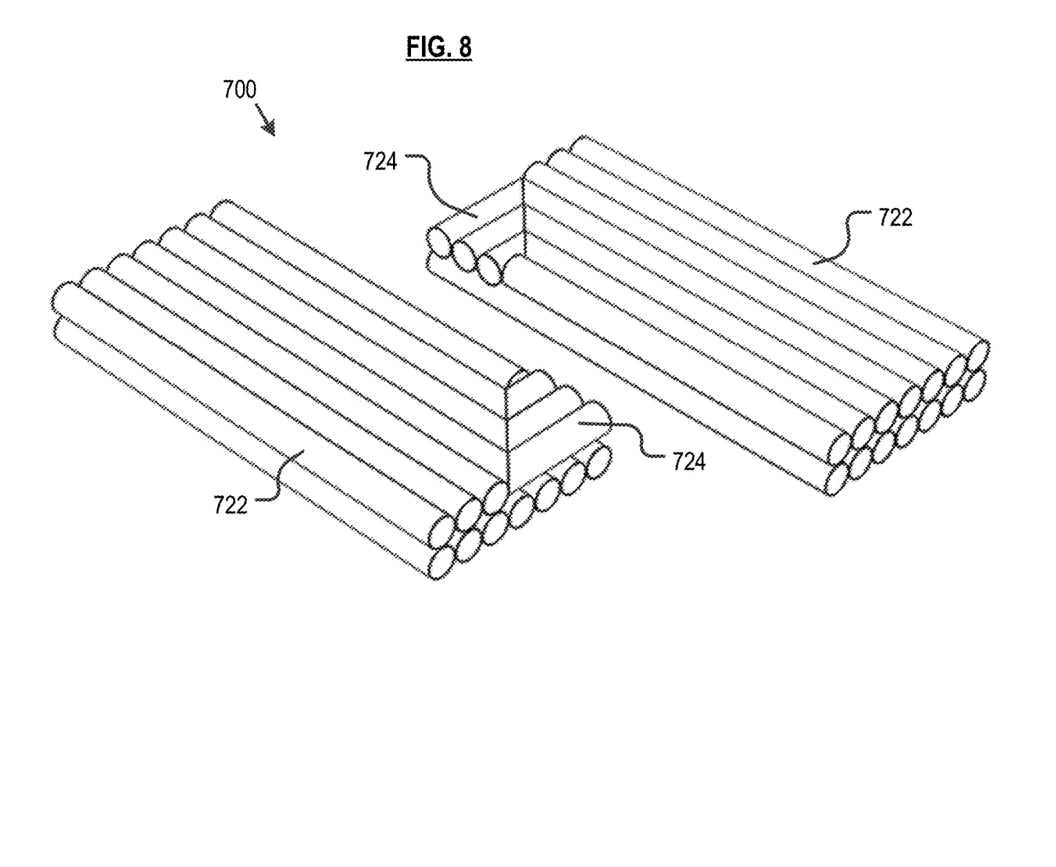
FIG. 8 depicts the preform layup of FIG. 7, sans mold cavity.
Figure 9:
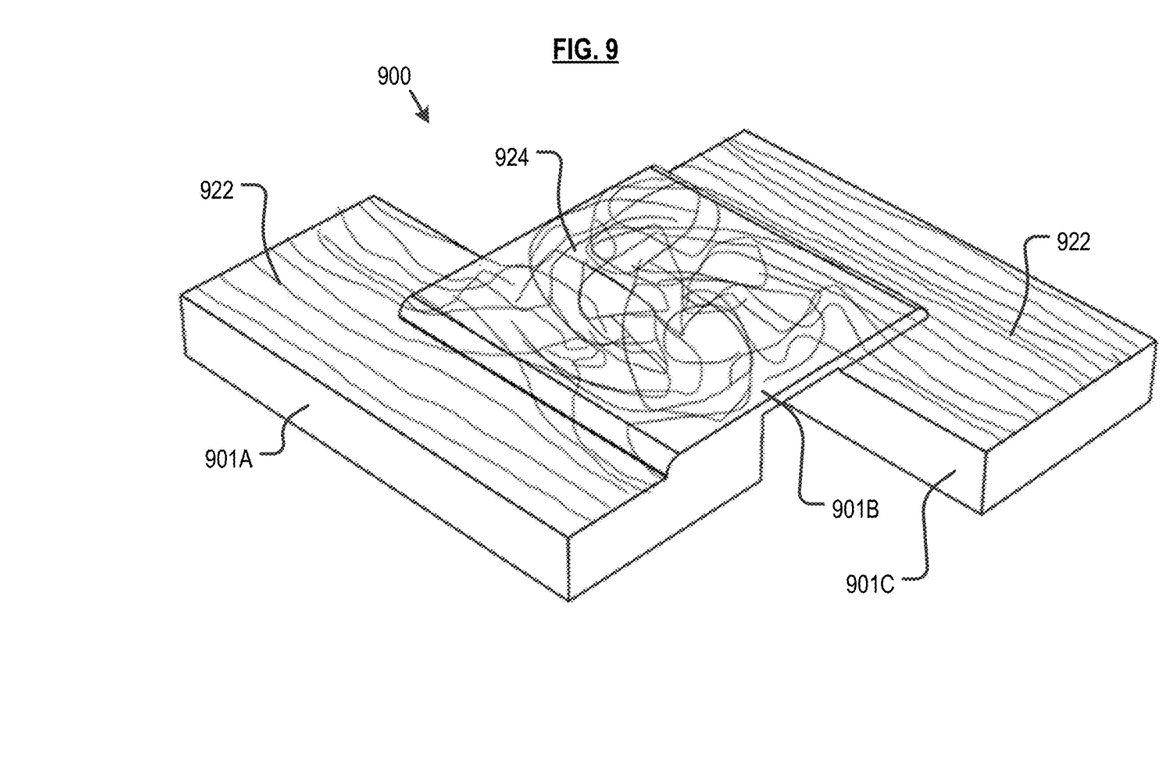
FIG. 9 depicts the fiber alignment in the part formed via compression molding of the preform layup of FIGS. 7 and 8.

FIGS. 7-9 depict an embodiment of the invention wherein the mold for a part being formed is too thin for the direct placement of preforms therein, and where anticipated stress is substantially transverse-isotropic. In a thin region of a part, having the majority of fibers aligned in any single direction compromises the strength of the region in other directions. Randomizing the direction of the fibers in such thin regions, via a method in accordance with the present teachings, avoids this problem.

FIG. 7 depicts mold 701, including portions 701A, 701B, and 701C. Mold portion 701B is too thin for the placement of preforms, thus prompting use of an embodiment of the present invention to flow fiber into that region by means of a pressure gradient. Thus, for preform arrangement 700, preforms 722 are placed in mold portion 701A and 701C, but not in 701B.

FIG. 8 depicts preform arrangement 700, with the mold omitted for clarity. Bent regions 724 of some of preforms 722 are directed towards mold portion 701B to direct the flow of fibers and promote mixing during the melt phase.

FIG. 9 depicts consolidated form 900, resulting from the compression molding of preform arrangement 700 of FIG. 7. Lines on the surface are indicative of fiber alignment within the volume of the part. Regions 901A and 901C consist of aligned fibers, consistent with the anticipated principal stress vectors in those regions. Region 901B demonstrates a random and varied fiber alignment, as a result of the flow of fibers therein. Once again, some fibers are continuous between regions 901B and 901A or 901C, such that portion 922 of such fibers are aligned and portion 924 is randomized.

Embodiments of the invention can also be used to interlock adjacent volumetric regions in scenarios where continuous preform segments cannot be used. The adjacent regions will share a common interface, such as a surface contour signifying the transition from one to the other. This transitional interface region prohibits the use of continuous preforms, but the adjacent regions enable their use. The shaping, sizing, and spacing of preforms immediately adjacent to the interface region can be used to create a preform cavity within the region. As the pressure gradient causes flow into the preform cavity, the associated fibers will mix and interlock in the interface region. The interlocked fibers will span the adjacent and interface regions of the final part, with aligned fibers in the adjacent regions continuously transitioning into random orientations in the interface region.

Figures 10, 11:
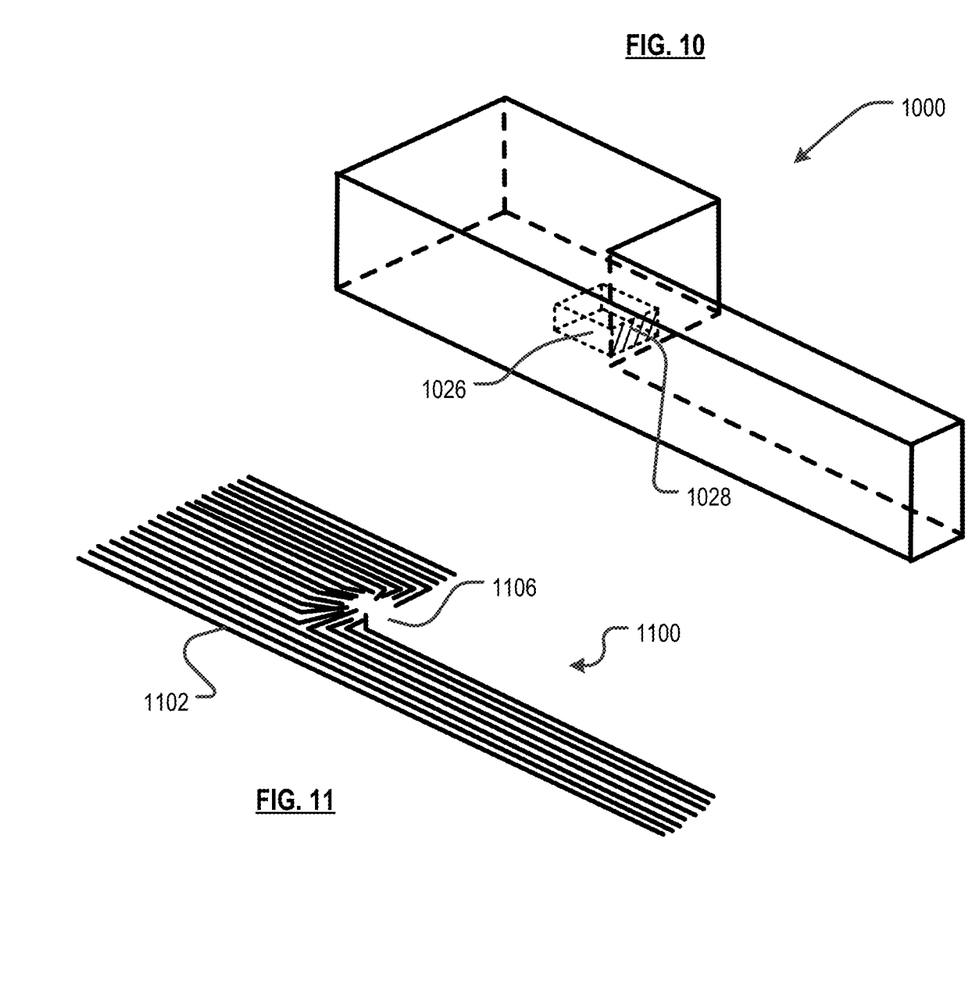
FIG. 10 depicts a finished part having a volumetric region in which a randomized fiber alignment is to be established in accordance with the present teachings, wherein a portion of volumetric region is coincident with the outer surface of the finished part.
FIG. 11 depicts an embodiment of a preform arrangement, in accordance with the present teachings, for establishing a preform cavity in a mold that will create a part having, per FIG. 10, the volumetric region that borders the outer surface of the finished part.

Some other embodiments consistent with the present teachings include those in which:

Referring to FIG. 10, a preform cavity is desired in volumetric region 1026 of finished part 1000, wherein the volumetric region has 1028 portion of its surface area on the outer surface of the finished part. In such embodiments, the inner mold surface will partially define the volume of the preform cavity. However, such a mold surface would not present a cavity in and of itself without the presence of a preform cavity, such as preform cavity 1106 of preform arrangement 1100 depicted in FIG. 11, in accordance with the present teachings. (Each "line" is FIG. 11 is representative of a preform; that is, preforms 1102. FIG. 11 depicts a single layer of preform arrangement 1100. It is to be understood that to create the full 3D structure of preform cavity 1106, and indeed to create a preform arrangement that fills a compression mold suitable for molding the part, many additional layers of the preform arrangement are required. The bent ends of preforms 1102 that are nearest to preform cavity 1106 will vary in directions from layer to layer, to create desired random orientation of fibers within volumetric region 1026.

The volumetric region of a preform cavity is defined, in part, by an insert component that is being co-molded into the part. A co-molded insert is any component being molded into the final part during the compression molding process. For example and without limitation, mechanical fastening components, metal bodies, electronic components, antennas, etc, are all examples of co-molded inserts that may partially define the volumetric region of a preform cavity in accordance with the present method. See, for example, FIG. 5.

Figure 12:
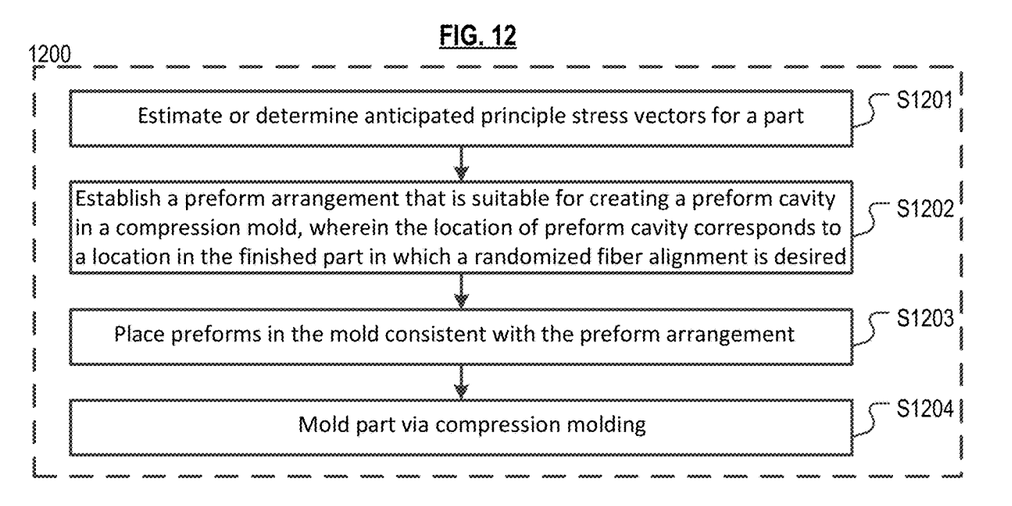
FIG. 12 depicts a flow chart of an embodiment of a method in accordance with the present teachings.

FIG. 12 depicts method 1200 in accordance with the illustrative embodiment of the present invention. The method assumes that a mold suitable for forming a part is available. Per operation S1201, the principle stress vectors expected to arise within a part due to loads the part experiences when in use are estimated (e.g., based on experience, etc.) or otherwise determined. This can analysis can be based on experience with similar parts, etc., relying on the knowledge of those skilled in the art. Alternatively, when a rigorous analysis is desired or necessitated (e.g., based on part complexity, etc.), the anticipated principle stress vectors can be determined by the methods disclosed in Pub. Pat. App. US2020/00130297, as previously disclosed.

In operation S1202, a preform arrangement implemented as: (1) a lay-up of individual preforms, (2) one or more preform charges, or (3) both (1) and (2), suitable for creating one or more preform cavities in a compression mold is established. The location of the one or more preform cavities in the compression mold corresponds to the respective one or more volumetric regions of the part in which randomized fiber alignment is desired. As previously discussed, such regions are those in which the anticipated principle stress vectors vary significantly with "small" changes in location, as referenced to the size of fiber-bundle-based preforms being used to form the preform arrangement.

The preform arrangement should also provide a desired fiber alignment in volumetric regions of the part in which the preforms can be shaped to align with the anticipated principle stress vectors. Moreover, the preform arrangement should ensure that, as a general principle, preform length is maximized consistent alignment constraints. Additionally, and importantly, fibers that are intended to reside in regions in which fiber alignment is randomized should extend into regions having a defined fiber alignment.

Figure 13:
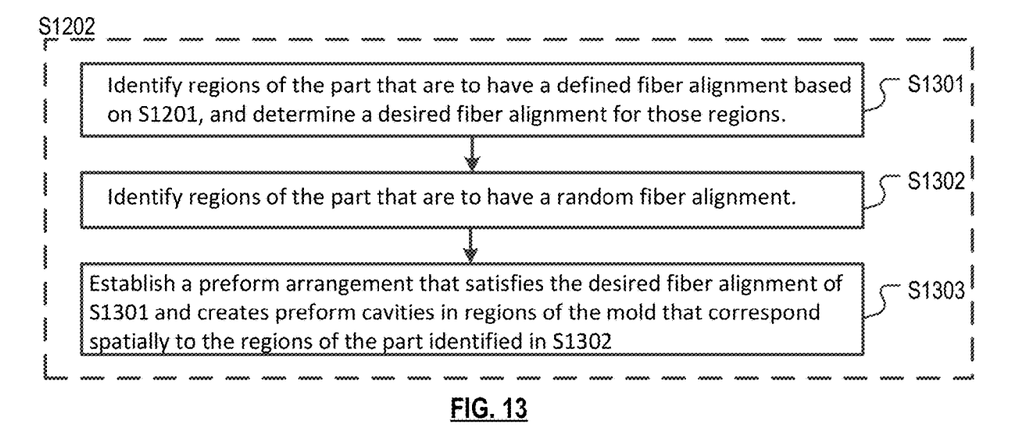
FIG. 13 depicts a flow chart of an embodiment of a method for accomplishing an operation of the method of FIG. 12.

FIG. 13 depicts a flow diagram of a method for accomplishing operation S1202. In accordance with operation S1301, one or more volumetric regions having a defined fiber alignment (wherein the fibers align with the principle stress vector) are identified based on the results of operation S1201 of method 1200, and a desired fiber alignment is determined for those regions. In a desired fiber alignment, the direction of the fibers in a particular volumetric region will align with the principle stress vectors in that region.

In operation S1302, one or more volumetric regions of the part that are to have a random fiber alignment are identified. As previously described, such regions are identified either by experience, or by a consideration of the anticipated principle stress vectors for the part in various regions in conjunction with the diameter of the fiber-bundle-based preforms being used to create the preform arrangement. It will be appreciated that operations S1302 can be performed before operation S1301, or these operations can be performed simultaneously.

As per operation S1303, a preform arrangement is established that satisfies the desired fiber alignment determined in operation S1301 and creates preform cavities in one or more regions of the mold that correspond spatially to the regions of the part identified in operation S1302 (i.e., the location(s) of randomized fiber alignment).

Returning to the method of FIG. 12, in operation S1203, preforms (i.e., either individually or as one or more preform charges) are placed in a compression mold consistent with the preform arrangement determined in operation S1202. And, in operation S1204, the part is molded via compression molding protocols (e.g., elevated pressure and temperature for a period of time, etc.).

It is to be understood that the disclosure describes a few embodiments and that many variations of the invention can easily be devised by those skilled in the art after reading this disclosure and that the scope of the present invention is to be determined by the following claims.

What is claimed:

1. A method comprising placing, in a compression mold, an arrangement of preforms, wherein the arrangement includes at least one preform cavity, wherein a location of the at least one preform cavity in the arrangement as placed in the mold corresponds to one or more first regions of a part, to be formed by the compression mold, at which a randomized fiber alignment is to be established.

2. The method of claim 1 comprising estimating or determining anticipated principal stress vectors arising in the part, based on expected loading conditions for the part.

3. The method of claim 2 comprising identifying, from the anticipated principle stress vectors, the one or more first regions of the part in which the randomized fiber alignment is to be established.

4. The method of claim 3 comprising determining, for the one or more first regions, which of such regions is to be created by respective ones of preform cavities.

5. The method of claim 4 wherein determining which one or more first regions is to be created by respective ones of preform cavities is based, in part, on a diameter of the preforms in the arrangement.

6. The method of claim 3 comprising determining, for second regions of the part, defined fiber alignments that correspond to the anticipated principle stress vectors in the second regions.

7. The method of claim 6 comprising establishing the arrangement of preforms, wherein the arrangement of preforms is suitable for providing the defined fiber alignments, and for creating the respective ones of preform cavities.

8. The method of claim 7 wherein establishing the arrangement of preforms comprises positioning preforms in the arrangement so that for some fibers in the part formed from the arrangement, each of said some fibers has a first portion in the first region of the part having randomized fiber alignment and a second portion in the second region of the part having fibers the defined fiber alignments.

9. The method of claim 1 comprising forming the part by subjecting the arrangement of preforms to compression molding protocols of elevated pressure and temperature for a period of time.

10. The method of claim 1 wherein the arrangement of preforms comprises a lay-up of individual preforms.

11. The method of claim 1 wherein the arrangement of preforms comprises a preform charge.

12. The method of claim 1 comprising positioning an insert in the at least one preform cavity.

13. A method comprising:
establishing a preform arrangement that is suitable for creating a preform cavity, wherein a location of the preform cavity in the preform arrangement corresponds to a first region in a part molded from the preform arrangement, wherein a randomized fiber alignment is desired in the first region;
placing preforms in the mold consistent with the established preform arrangement;
subjecting the preform arrangement to elevated temperature and pressure for a period of time, consistent with compression molding protocols, thereby molding the part.

14. The method of claim 13 comprising estimating or determining anticipated principal stress vectors arising in the part, based on expected loading conditions for the part.

15. The method of claim 14 comprising identifying, from the anticipated principle stress vectors, the first region of the part.

16. The method of claim 15 comprising identifying, from the anticipated principle stress vectors, second regions of the part, wherein in the second regions of the part, fibers are to be substantially aligned with the anticipated principle stress vectors therein, providing, for the second regions, a defined fiber alignment.

17. The method of claim 16 wherein establishing the preform arrangement comprises positioning preforms so that:
(a) the arrangement is suitable for providing the defined fiber alignments in the second regions, and
(b) the preform cavity is created.

18. The method of claim 13 wherein establishing the arrangement of preforms comprises positioning preforms in the arrangement so that for some fibers, sourced from the preforms, in the part, each of said some fibers has a first portion in the first region of the part and a second portion in a second region of the part having a defined fiber alignment.

19. The method of claim 13 comprising co-molding an insert with the part by positioning the insert in the preform cavity.

20. A method comprising:
establishing a preform arrangement that is physically configured to include a preform cavity, and further configured so that, when molded to form a part, provides defined fiber alignments in respective second regions of the part, wherein the defined fiber alignments are characterized by fibers, sourced from preforms in the preform arrangement, that are substantially aligned with anticipated principle stress vectors arising in the respective second regions of the part;
placing, in a compression mold, preforms consistent with the established preform arrangement; and
subjecting the preform arrangement to elevated temperature and pressure for a period of time, consistent with compression molding protocols, thereby molding the part.

21. The method of claim 20 wherein the compression mold comprises a first portion that is incapable of receiving preforms of the preform arrangement due to a size constraint of the first portion, and wherein the first portion is located between a second portion and a third portion of the compression mold, and wherein establishing the preform arrangement comprises positioning the preform cavity in the preform arrangement so that when the preform arrangement is placed in the compression mold, the preform cavity coincides with the first portion of the compression mold.

* * * * *